(12) United States Patent
Nohnishi

(10) Patent No.: US 6,906,822 B1
(45) Date of Patent: Jun. 14, 2005

(54) PAGE PRINTER AND PAGE PRINTER CONTROL METHOD

(75) Inventor: Toyoshige Nohnishi, Kawasaki (JP)

(73) Assignee: Fuji Xerox Co., LTD, Tokyo (JP)

( * ) Notice: Subject to any disclaimer, the term of this patent is extended or adjusted under 35 U.S.C. 154(b) by 0 days.

(21) Appl. No.: 09/551,597

(22) Filed: Apr. 17, 2000

(30) Foreign Application Priority Data

Sep. 14, 1999 (JP) .......................................... 11-260905

(51) Int. Cl.[7] .............................................. G06F 15/00
(52) U.S. Cl. .................... 358/1.16; 358/1.15; 358/1.14; 358/1.2; 358/1.9; 358/528
(58) Field of Search ............................ 358/1.16, 1.15, 358/1.9, 1.2, 528, 426.05, 426.06, 444, 448; 347/235–238

(56) References Cited

U.S. PATENT DOCUMENTS

| | | | | |
|---|---|---|---|---|
| 5,724,154 A | * | 3/1998 | Ito et al. ..................... | 358/400 |
| 6,304,336 B1 | * | 10/2001 | Sugaya ...................... | 358/1.16 |

FOREIGN PATENT DOCUMENTS

| | | |
|---|---|---|
| JP | 2-9654 | 1/1990 |
| JP | 8-25716 | 1/1996 |
| JP | 9-314930 | 12/1997 |
| JP | 10-16322 | 1/1998 |
| JP | 10-305624 | 11/1998 |

\* cited by examiner

Primary Examiner—Twyler Lamb
(74) Attorney, Agent, or Firm—Westerman, Hattori, Daniels & Adrian, LLP

(57) ABSTRACT

The present invention relates to a page printer control method, a page printer therefor, for compressing print data for one page and for storing the compressed data in a memory, so that even when a printing resolution is changed in due to a memory shortage, the resolution can be used for all the pages of a document. According to the present invention, a system for controlling a page printer includes a memory, a controller for drawing print data, a compression circuit for compressing drawing data, an expanding circuit for expanding the compressed data, and a video output circuit for outputting expanded data to the printer engine as a video signal. The controller detects the remaining capacity of the compression data area in the memory, and when a memory shortage is detected, i.e., when insufficient storage capacity is available, the printing resolution is changed and the drawing process is performed, starting at the beginning of the job.

9 Claims, 12 Drawing Sheets

PAGE PRINTER AND PAGE PRINTER CONTROL METHOD

BACKGROUND OF THE INVENTION

1. Field of the Invention

The present invention relates to a page printer control method for printing complicated print data when little memory is available, and a page printer therefor, and relates in particular to a page printer control method for preparing one page of drawing data for a page printer engine, and a page printer therefor.

2. Related Arts

In a page printer, such as an electrophotographic apparatus, a printing unit (engine) forms print images at a constant speed. Thus, a print controller which creates raster image data must send synchronizedly video data to the printing unit with the operation of the printing unit.

Before the printing of each page is started, a conventional print controller, using received data, creates a page of raster image data(drawing data) in memory. Then, while printing, the printer controller starts the operation of the printing unit and reads from the memory and transfers to the printing unit video signals, beginning with the first video signal of a page.

Since according to this technique video signals for one A4 size page are stored at a resolution of 600 dpi, approximately 4 M bytes of memory are required to store one page of raster image data. And as a result, since circuit costs have been reduced by recent advances in LSI circuit construction, the memory which is required accounts for half the cost of a printer controller.

Therefore, a technique has been proposed by which the required memory capacity can be reduced. According to this technique, after each page of raster image data is prepared using received data, the raster image data are compressed, and then the compressed data are stored in memory. Then, to print the compressed raster image data, the data are expanded (decompressed) and the video signals are prepared.

Since according to this method raster image data for one A4 size page are stored at a resolution of 600 dpi, as described above, only half of the memory capacity, i.e., 2 M bytes, is required. Thus, the cost of a printer controller can be considerably reduced.

However, since the compression ratio attained using this technique varies depending on the image which is to be printed, the volume of one page of compressed data changes in accordance with the print image contents. And since the predetermined memory capacity provided for the storage of one page of compressed data is a constant, if the size of the compressed image data for a page containing a complicated print image exceeds the capacity of an area allocated in memory, storage of the data will not be possible, i.e., a memory shortage will occur. And when a memory shortage occurs, printing can not be performed.

To avoid this problem, one method has been proposed whereby raster image data for one page are re-created at a lower resolution and compressed, and the resultant compressed raster image data are stored in memory (e.g., Japanese Unexamined Patent Publication No. Hei 10-305624). When the resolution is reduced, for example, to 300 dpi, the volume of the compressed data is also reduced by half, permitting, thereby, the storage of the data in memory and the continuation of the printing operation.

However, the conventional technique has the following shortcomings.

The conventional technique constitutes a method whereby, when a memory shortage is detected while print data for a specific page are being drawn or compressed, the compression operation is halted, the resolution is reduced, and the pertinent print data are redrawn or recompressed. Thus, when an individual document to be printed is regarded as a print job, a single job frequently involves the printing of a plurality of pages, and if a document (one job) consisting of a plurality of pages is printed in accordance with the conventional method, whereby the resolution used for individual pages can vary, the resolution employed for printing the pages may vary throughout the document. For example, a first and a second page may be printed at a resolution of 600 dpi, while a third page may be printed at a resolution of 300 dpi. Since, as is described above, when printing a single document a variety of resolutions may be used, an overall, unaesthetic appearance is presented by a document printed in accordance with the conventional method. Especially when an official document, such as one for a proposal or for a report, is submitted to a third party, while reading the document the recipient may experience a sense of dissatisfaction.

SUMMARY OF THE INVENTION

It is, therefore, one objective of the present invention to provide a page printer control method whereby, even when resolution changes due to memory shortages occur, the mismatching of printing resolutions used for the pages of a single document is prevented, and a page printer therefor.

It is another objective of the present invention to provide a page printer control method whereby, even when resolution changes occur, the same printing resolution is employed for all the pages of a single document, and a page printer therefor.

It is an additional objective of the present invention to provide a page printer control method whereby, even when resolution changes occur, a simple method is used to maintain and employ the same printing resolution for all the pages of a single document, and a page printer therefor.

To achieve the above objectives, according to one aspect of the present invention, a page printer comprises:

- a printer engine;
- a memory which includes an input area, for storing input data, a compression area, for storing compressed drawing data, and a bit-map area, for storing expanded drawing data;
- a compression circuit, for compressing drawing data and for storing the resultant compressed drawing data in the compression area of the memory;
- an expanding circuit, for expanding the compressed drawing data stored in the compression area of the memory and for storing the resultant expanded drawing data in the bit-map area of the memory;
- a video output circuit, for reading the expanded drawing data stored in the bit-map area of the memory and for transmitting the expanded drawing data to said printer engine; and
- a controller, for managing for each job the input data stored in the input area of the memory and for analyzing the input data for each job and creating drawing data for a designated resolution. The controller detects whether a memory shortage, which will prevent the storage of the compressed drawing data for one page, has occurred in the compression area of the memory. When the controller detects that a memory shortage has occurred, the controller changes the designated resolution to a lower one, and repeats the input data analyzation process beginning with the input data entered for the first page of the job.

According to the present invention, first, when a memory shortage has occurred and compressed data can not be stored in the memory, the resolution is changed, and then the input data analyzation process is restarted, beginning with the first page of the job. Therefore, starting with the first page of the job, printing is performed using the changed resolution. And thus, even when a resolution change has occurred, the same resolution can be maintained and employed for all the pages of a document. In this manner, the odd appearance which is presented when different resolutions are used for printing the pages of a single document can be avoided. This method is especially effective for the printing of official documents.

Second, the management of input data is provided for each job. And therefore, even when a memory shortage occurs while a job is being analyzed, the analyzation process can be easily restarted beginning again at the first page of the job.

The present invention can employ the following feature. The controller includes a pointer for indicating the progress of the analyzation performed for the input data of a job. And when the controller detects a memory shortage, it can reinitialize the analysis pointer so that it points to the first position occupied by the input data for a job.

According to this feature, since the pointer is used during the performance of the analyzation process, even when a memory shortage occurs while a job is being the analyzed, the pointer can be reinitialized and the analyzation process can be restarted at the beginning of the job.

According to another aspect of the present invention, each time the compression circuit writes the compressed drawing data in the compression area of the memory, the controller updates a memory variable indicating the remaining capacity of the compression area, and in accordance with the remaining capacity, determines whether a memory shortage has occurred. Thus, a memory shortage can be detected easily. And when a print start command is detected as a result of the analysis of input data, the controller activates the expanding circuit and the video output circuit. Therefore, since data expanding and video output are begun in response to a print start command included in input data, page control can be easily performed.

Further, according to an additional aspect of the present invention, the page printer comprises: selection means which, to restart printing, selects either the first page of the job or a page whereat the memory shortage occurred. When a page whereat the memory shortage occurred is selected, the controller begins the analyzation of input data for the page whereat the memory shortage occurred.

According to this aspect, there are two modes which can be selected by the selection means when a memory shortage occurs: a document mode for changing the resolution beginning with the first page of a job, and a page mode for changing the resolution beginning with the page whereat the memory shortage occurred or for changing the resolution only for the specific page whereat the memory shortage occurred. In the document mode, the same resolution is employed for all the pages of a document; however, the pages preceding a page whereat a memory shortage occurs are wasted, as far as printing is concerned. So to prevent this waste, the page mode is provided which changes the resolution beginning at a page whereat a memory shortage occurs, or which changes the resolution only for the page whereat the memory shortage occurred. Therefore, in accordance with the mode which is selected, an official document can be printed using the document mode so that a common resolution is employed for the entire job, and an in-house use document can be printed using the page mode so that the waste produced by the document mode is eliminated.

In the page mode, the controller can designate a lower resolution for use only on a page whereat a memory shortage occurred, and can thereafter resume the analyzation of data. In this case, since only the page whereat the memory shortage occurred is printed at a low resolution, a higher resolution can be used for printing all the other pages.

According to a further aspect of the present invention, whenever a resolution is changed the controller displays a change message on a display panel. According to this aspect, since a resolution change message is displayed, an operator is notified each time an automatic resolution change occurs.

The present invention can also employ the following feature. The controller includes a pointer for indicating the progress of the analyzation performed for the data input for a job. And when the controller detects a memory shortage, it can reinitialize the analysis pointer so that it points to the first position occupied by the input data for the job. According to this feature, since the analyzation pointer is used during the performance of the data analyzation process, even when a memory shortage occurs while a job is being analyzed, the pointer can be reinitialized and the analyzation process can be restarted at the beginning of the job. When a print start command is detected as a result of the analyzation of the input data, the controller activates the expanding circuit and the video output circuit. And since data expanding and video output are begun in response to the print start command contained in the input data, page control can be easily performed.

In the page mode, the controller designates a lower resolution only for a page whereat a memory shortage has occurred, and then resumes the analyzation of the data. In this case, since only the page whereat the memory shortage occurred is printed at a low resolution, a higher resolution can be used for printing all the other pages.

When the resolution is changed, the controller prepares drawing data describing the resolution change. Thus, an additional message to the effect that the resolution was changed can be printed on the page whereat the change occurred. Therefore, when a resolution change occurs, the printed document can be used to notify the person who requested that the printing be performed.

DETAILED DESCRIPTION OF THE PREFERRED EMBODIMENTS

Figure 1:
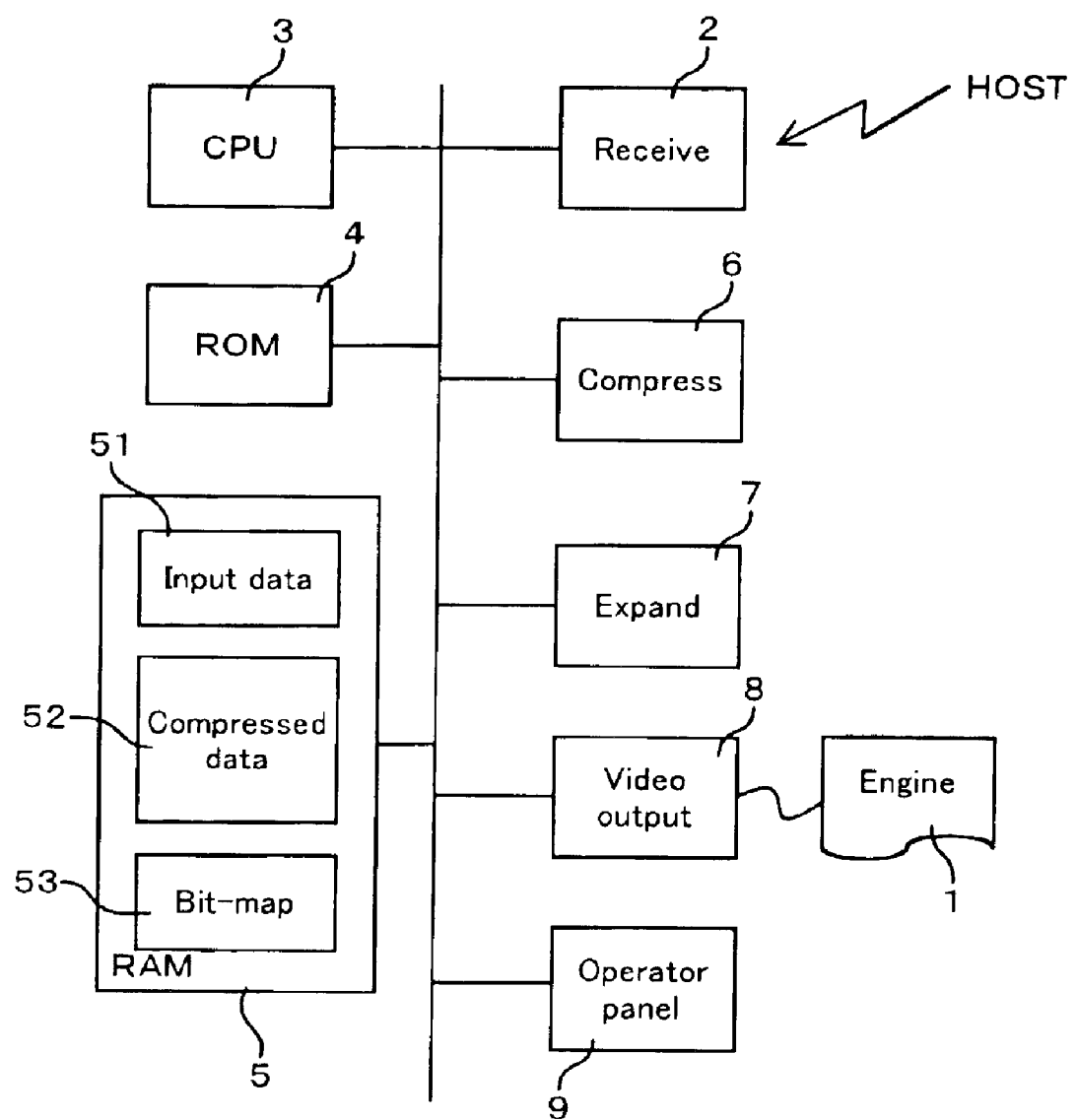
FIG. 1 is a block diagram illustrating a printer controller according to one embodiment of the present invention.
Figure 2:
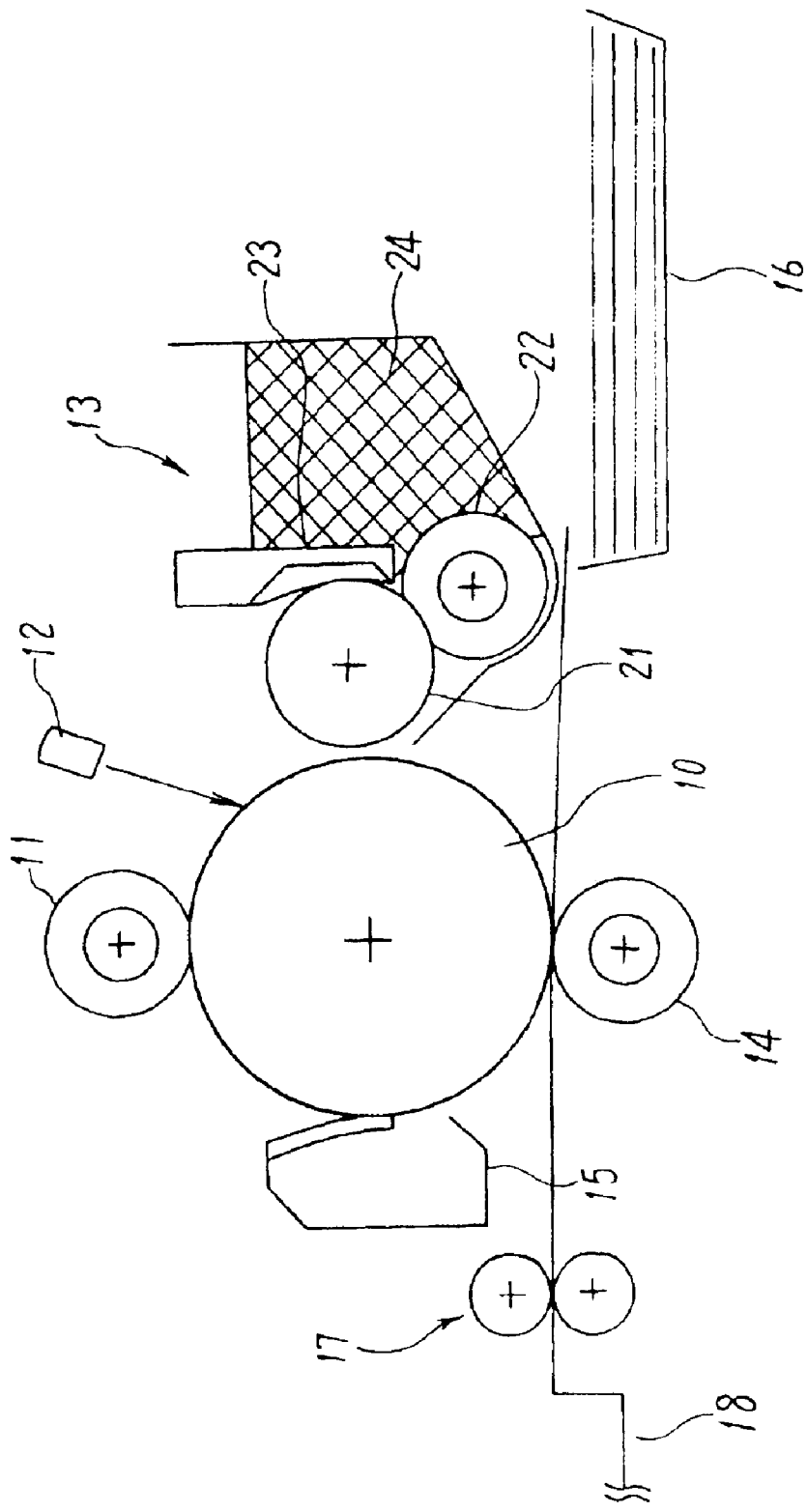
FIG. 2 is a diagram illustrating the arrangement of a printer engine in FIG. 1.
Figure 3:
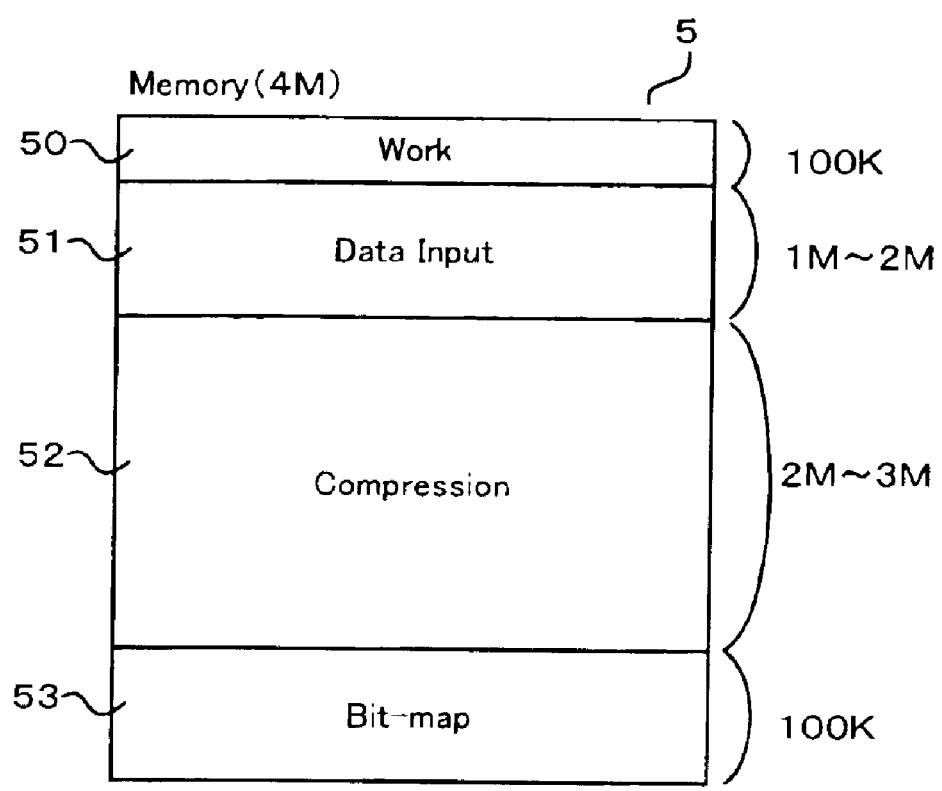
FIG. 3 is a diagram for explaining the memory space allocated in FIG. 1.

FIG. 1 is a block diagram illustrating a printer controller for one embodiment of the present invention. FIG. 2 is a diagram showing the arrangement of a printer engine in FIG. 1, and FIG. 3 is a diagram for explaining the memory space allocated in FIG. 1. Before the configuration of the printer controller in FIG. 1 is explained, the arrangement of a printer engine 1 in FIG. 1 will be described while referring to FIG. 2. As is shown in FIG. 2, the printer engine 1 is constituted by an electrophotographic apparatus.

In FIG. 2, a latent image bearing member 10 is a photosensitive drum, such as an OPC. A pre-charger 11 charges the photosensitive drum 10 by applying a voltage to a charging member, such as a conductive brush or a conductive roller. A corona charger may be used for the pre-charger 11. An exposure unit 12, which is constituted by a laser scanning optical system or an LED array, exposes the photosensitive drum 10 and forms an electrostatic latent image thereon in accordance with an image pattern signal (a video signal).

A developing unit 13, which is constituted by a one-component developing unit and is located opposite the photosensitive drum 10, develops an electrostatic latent image on the photosensitive drum 10 using a one-component developer. Included in the one-component developing unit 13 is a developing roller 21, a feed roller 22, a regulation blade 23 and a one-component developer (toner) 24. A transfer unit 14 has an electroconductive flexible member (sponge or rubber) to which a transfer bias voltage is applied. The transfer unit 14, which may be constituted by a corona charter, transfers to a recording medium a toner image formed on the photosensitive drum 10. A cleaning member 15, such as a rubber blade, is pressed against the photosensitive drum 10 and removes toner which remains on it after a toner image has been transferred. Another type of cleaning member 15, such as a cleaning brush, may be used.

A hopper 16 is used to store recording sheets (unprinted) which are fed to the transfer unit 14 by a feeding mechanism (not shown). Thereafter, a fixing unit 17 fixes the toner image to the sheet, and a stacker 18 stores the image bearing sheets.

The operation performed by the printer engine 12 in FIG. 2 will now be explained. A predetermined voltage, e.g. −600 to −700 V, is used by the pre-charger 11 to electrify the photosensitive drum 10. Then, in accordance with an image signal, the exposure unit 12 exposes the photosensitive drum 10 and forms an electrostatic latent image on it. Thereafter, the electrostatic latent image on the photosensitive drum 10 is developed by the one-component developing unit 13 by the attachment of developer 24, and the transfer unit 14 transfers the developed image from the photosensitive drum 10 to a sheet which is supplied from the hopper 16. Following this, the transferred image is fixed to the sheet by the fixing unit 17, while the developer remaining on the photosensitive drum 10 is removed by the cleaning member 15. Finally, the sheet to which the image has been fixed is stored in the stacker 18. As is shown in the block diagram for the printer controller in FIG. 1, a reception circuit 2 receives data (print data) from a host. A controller 3 is constituted by a CPU, which performs an analyzation process. A ROM (Read Only Memory) 4 is used to store programs and data required by the CPU 3. And a RAM (Random Access Memory) 5 is used to store various types of data.

As is shown in FIGS. 1 and 3, the RAM 5 includes: a work area 50, for storing drawing data; input data 51, for storing input data for each job; a compression area 52, for storing compressed drawing data; and a bit-map area 53, for storing expanded bit-mapped data. When the RAM 5 is a memory of 4 M bytes, a capacity of 100 K bytes is allocated for the work area 50, 1 to 2 M bytes are allocated for the data input area 51, 2 to 3 M bytes are allocated for the compression area 52, and 100 K bytes are allocated for the bit-mapped area 53. The capacity of the bit-mapped area 53 is equivalent to less than one page and to 256 rasters.

A data compression circuit 6 creates compressed data, which are wriiten in the compression area 52 of the RAM 5, by compressing drawing data stored in the work area 50 of the RAM 5. For the compression process, various compression methods may be used; in this embodiment, for example, the TIFF (Tagged Image File Format) is employed.

A data expanding circuit 7, which begins to expand data upon receiving an instruction from the CPU 3, reads compressed data from the compression area 52 of the RAM 5, expands (decodes) the data, and writes the expanded data (bit-mapped data) to the bit-map area 53 of the RAM 5. A video output circuit 8, which initiates an output process upon receiving an instruction from the CPU 3, reads bit-mapped data from the bit-map area 53 of the RAM 5, and outputs it as a video signal to the printer engine 1. And an operator panel 9 transmits an instruction to a printer, and displays the state of the printer.

Figure 4:
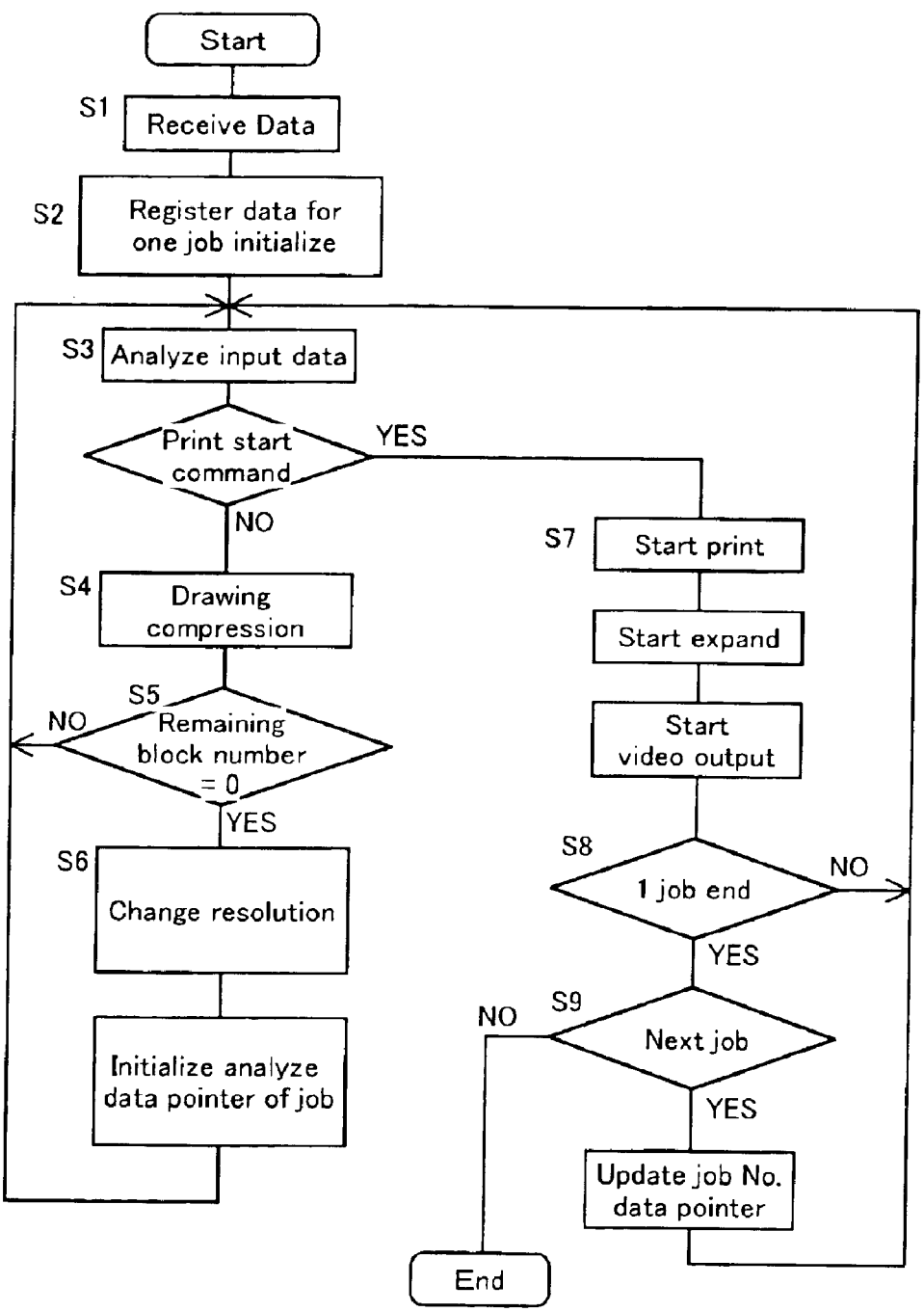
FIG. 4 is a flowchart showing the processing performed in accordance with the embodiment of the present invention.
Figure 5:
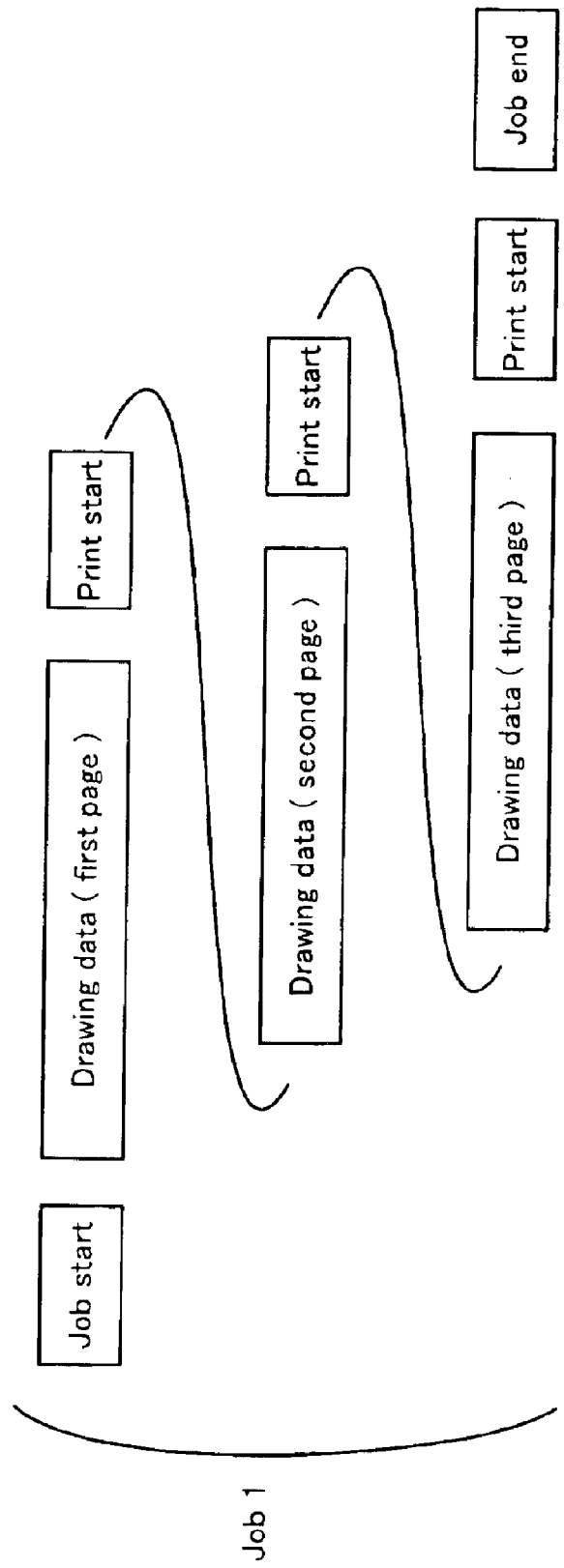
FIG. 5 is a diagram for explaining the input of data in FIG. 4.
Figure 6:
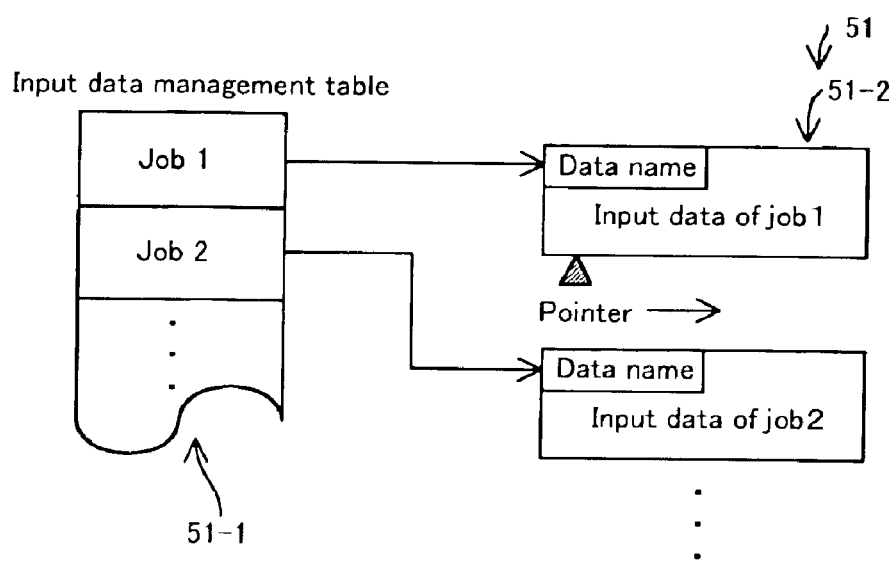
FIG. 6 is a diagram for explaining the analyzation process in FIG. 4.
Figure 6:
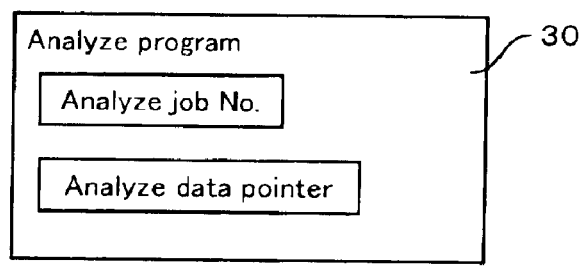
Figure 6:
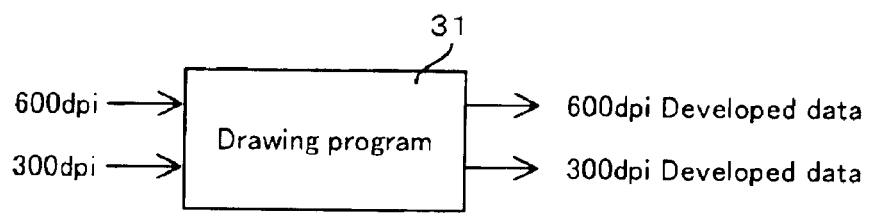
Figure 7:
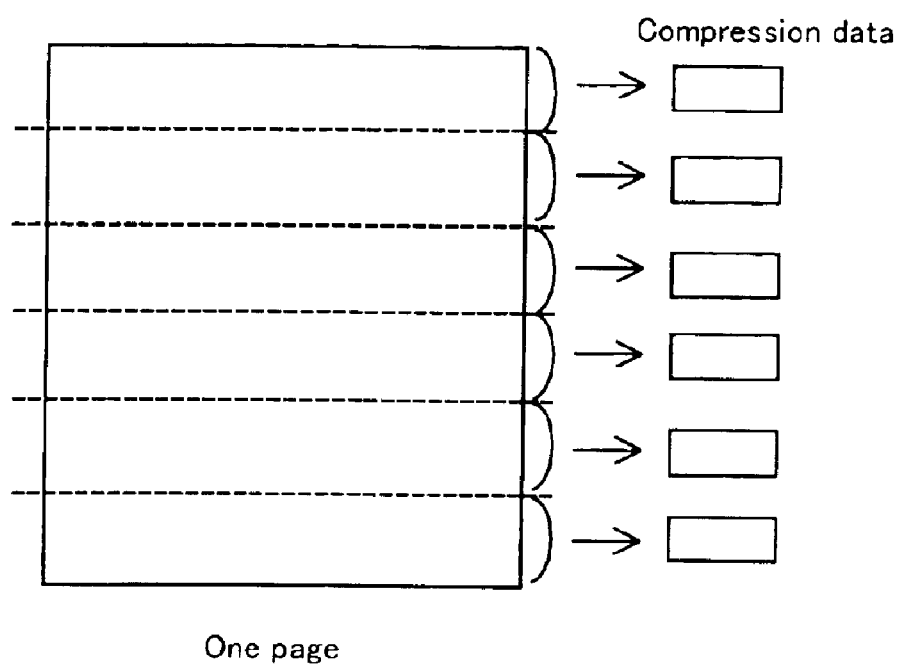
FIG. 7 is a diagram for explaining the compression process in FIG. 4.
Figure 8:
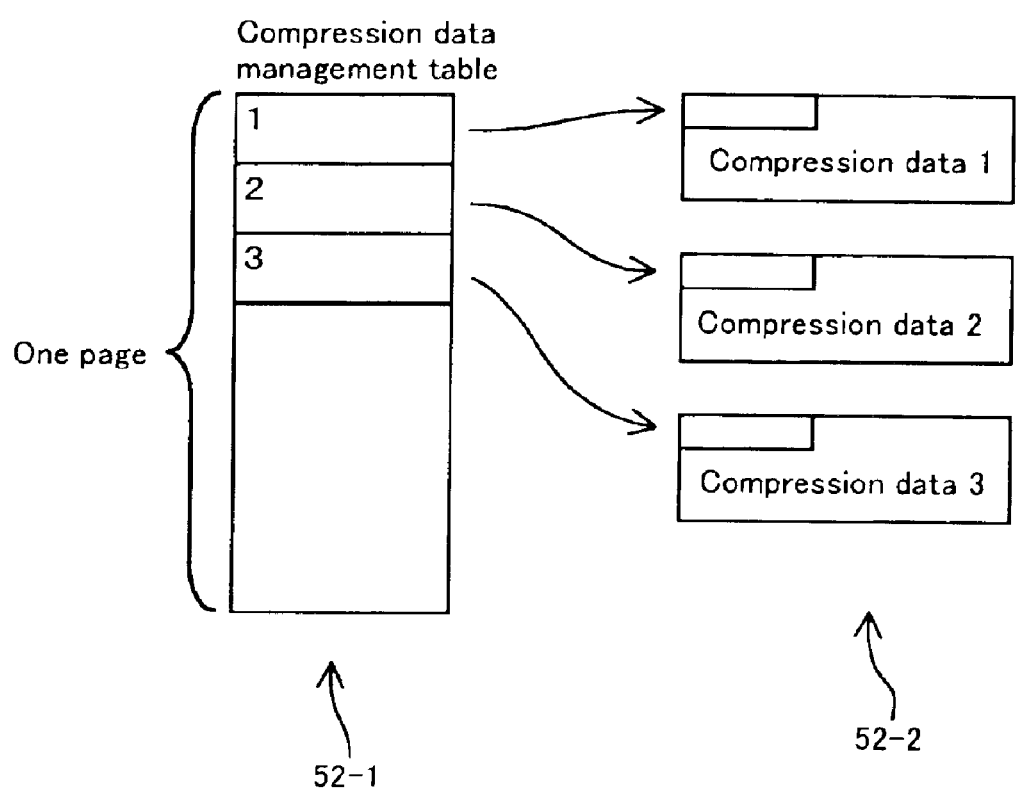
FIG. 8 is a diagram for explaining the storage of compressed data in FIG. 4.

FIG. 4 is a flowchart for the embodiment of the present invention; FIG. 5 is a diagram for explaining input data; FIG. 6 is a diagram for explaining the analyzation process; FIG. 7 is a diagram for explaining the compression process; and FIG. 8 is a diagram for explaining compressed data. The processing performed by the CPU 3 will now be described while referring to FIG. 4.

(S1) The reception circuit 2 receives data input by a host. As is shown in FIG. 5, the input data is formatted so that the data for each job can be identified. That is, the input data for each job consists of a job start command, drawing data (first page), a print start command (first page), drawing data (second page), a print start command (second page), drawing data (third page), a print start command (third page), and a job end command. Since, in the example in FIG. 5, one job (one document) consists of three pages, the job is composed of drawing data and print start commands for three pages. However, when one job consists of four pages, one job is composed of drawing data and print start commands for four pages.

(S2) For each job, the CPU 3 stores the data which is received in the input area 51 of the RAM 5. As is shown in FIG. 6, an input data management table 51-1 is prepared in the input area 51 of the RAM 5, and the input data for each job are stored in the input area 51 of the RAM 5. A pointer, which points to the first position in the storage area of the input data for each job, is entered in the input data management table 51-1.

The CPU 3 initializes an analyzation program 30. That is, as is shown in FIG. 6, an analyzation job number is set, and an analyzation data pointer, which points to the position at which the analyzation of input data is being performed, is initialized. A high resolution (600 dpi) is designated for a drawing program 31.

(S3) The CPU 3 executes the analyzation program 30. That is, in accordance with the analyzation job number and the analyzation data pointer, the input data stored in the input area 51 of the RAM 5 are analyzed. And when, as a result of the analyzation, it is ascertained that the input data is a print start command, program control goes to step S7.

(S4) When, based on the analyzation of the input data, the CPU 3 determines that the input data do not constitute a print start command, but instead constitute a drawing command, the drawing process and the compression process are begun. That is, at the designated resolution, the drawing program 31 in FIG. 6 employs drawing data to prepare development data (raster data), and the obtained data are stored in the work area 50 of the RAM 5. After the CPU 3 has prepared a predetermined quantity (e.g., 256 rasters) of development data and has stored the data in the work area 50, it activates the compression circuit 6. Sequentially, the compression circuit 6 reads and compresses the development data in the work area 50 to obtain compressed data, and as is shown in FIG. 7, converts the development data for a segment (e.g., 256 rasters) consisting of one page into a compressed data set, which is stored in the compression area 52 of the RAM 5. The number of blocks of the compressed data which are stored in this fashion varies in accordance with the development data. And as is shown in FIG. 8, pointers to the individual compressed, one-page data sets are stored in a compressed data management table 52-1, which is prepared in the compression area 52.

Each time the compression circuit 6 writes compressed data to the compression area 52 of the RAM 5, the CPU 3 updates the number of blocks remaining in the compression area 52 so that it corresponds with the number of blocks of compressed data which are available.

(S5) The CPU 3 determines whether the number of remaining blocks is "0." When the number of remaining blocks is not "0," the CPU 3 updates the analyzation data pointer, and program control returns to the data analyzation process at step S3.

(S6) When the number of remaining blocks is "0," it is assumed that the compression area 52 of the RAM 5 has been filled, and that the remaining sets of compressed one-page drawing data can not be stored. When the CPU 3 determines that the number of remaining blocks is "0," it changes the designated resolution for the drawing program 31 to a low resolution (300 dpi), and initializes the analyzation data pointer in the analyzation program 30. Thus, the analyzation data pointer points to the first position of the input data for a job which is currently being executed. Then, program control returns to the data analyzation process at step S3, and using the altered resolution, the drawing process is performed beginning with the first page of the current job.

(S7) When the CPU 3 determines that the input data is a print start command, the CPU 3 begins the printing process, i.e., it activates the data decompression circuit 7. The data decompression circuit 7 reads compressed data from the compression area of the RAM 5, and expands it to obtain decompressed data (bit-mapped data). The decompressed data are then stored in the bit-mapped area 53 of the RAM 5, an area which serves as a buffer for the development of bit-mapped data. The CPU 3 also activates the video output circuit 8, which reads bit-mapped data from the bit-mapped area 53 of the RAM 5 and outputs the data as a video signal to the printer engine 1.

(S8) When the CPU 3 determines one job has been completed, it refers to the input data management table 51-1 to determine whether another job has been entered in the table. When there are no more jobs, the processing is terminated. But when another job is found, the CPU 3 updates the job number for the analyzation program 30, initializes the analyzation data pointer, and resets the designated resolution. Program control then returns to step S3.

In this manner, while drawing data are being compressed, the number of blocks remaining in the data compression area 52 is monitored, and when no more blocks are available, it is ascertained that a memory shortage has occurred. Thus, the printing resolution can be changed (to a lower resolution), and the analyzation process resumed, starting at the beginning of the job, so that for each job, a common printing resolution is used. As is shown in the diagram in FIG. 9 for the printing operation, when a first page and a second page have been printed at a high resolution of 600 dpi and a memory shortage occurs during the analyzation process performed for a third page, the resolution is automatically changed to a lower resolution of 300 dpi, and the drawing process is performed at 300 dpi, beginning with the first page of the job. Therefore, a first, a second and a third page for the job are all printed at a resolution of 300 dpi.

In this fashion, even when the resolution is automatically changed due to the occurrence of a memory shortage, the same printing resolution can be used for each page in a job, and differences in the appearance of individual printed pages can be prevented.

Furthermore, since the input data are managed for each job, the analyzation process can be easily performed beginning with the first page of a job.

In addition, since the position at which the analyzation process is performed can be managed by using the analyzation data pointer, by reinitializing the analyzation pointer the analyzation process can be easily resumed, beginning with the first page of a job.

Further, since each time compressed data are written to the compression area 52 the count of the number of unused blocks remaining in the compression area 52 is updated, the occurrence of a memory shortage can be easily detected.

Moreover, since at the time a resolution change is effected the CPU 3 displays, on the operator panel 9, a resolution change message, an operator can immediately ascertain that a printing resolution change has occurred.

Figure 10:
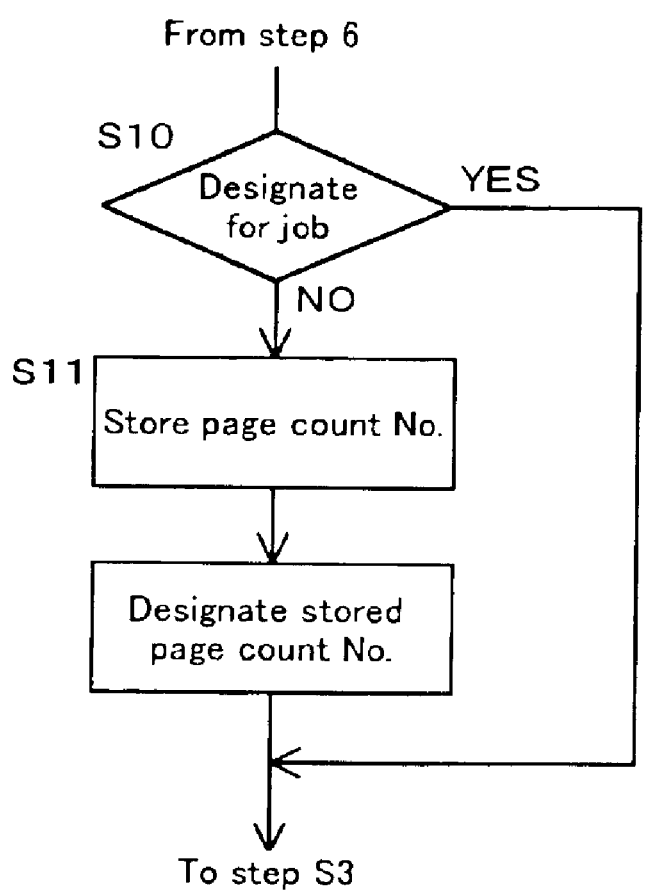
FIG. 10 is a flowchart showing the processing performed in accordance with another embodiment of the present invention.
Figure 11:
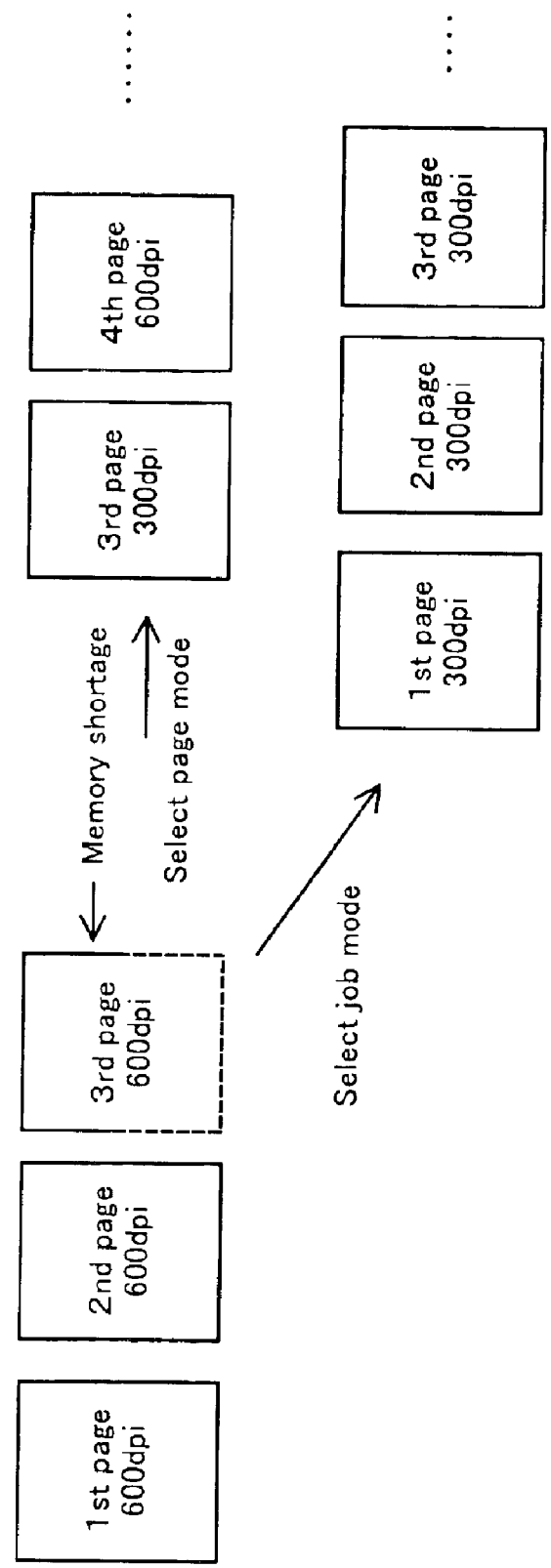
FIG. 11 is a diagram for explaining the operation performed by the embodiment of the present invention.

FIG. 10 is a flowchart for another embodiment of the present invention, and FIG. 11 is a diagram for explaining the operation of the embodiment.

In this embodiment, when a memory shortage is detected, there is a page mode for changing the resolution of the page for which the memory shortage was detected, and there is a job mode for changing the resolution for the job beginning with the first page. In the page mode, a changed resolution is not used in common for all the pages in a document, and the re-printing of pages printed before the memory shortage was detected is not required. Thus, pages that were previously printed can be effectively employed.

The page mode or the job mode can be selected using the operator panel 9. In FIG. 11, after the first and the second pages were printed at 600 dpi, a memory shortage was detected during the analyzation of the third page. When the page mode has been designated, the third page, for which the memory shortage was detected, is printed at a lower resolution of 300 dpi, and when no further memory shortages are detected, the fourth and following pages are printed at a high resolution of 600 dpi. Therefore, only the page for which the memory shortage was detected is printed at a low resolution.

When the job mode has been selected, the printing is performed at a low resolution of 300 dpi, beginning with the first page of the job.

This operation can be implemented by additionally performing, following step S6 in FIG. 4, the processing in FIG. 10.

(S10) The CPU 3 determines whether the job mode or the page mode has been selected. When the job mode has been designated, program control exits this routine, and returns to step S3 in FIG. 4.

(S11) When the page mode has been designated, the CPU 3 stores a count value for the page that is currently being processed. Therefore, an analyzed page counter is provided for counting the number of pages that have been analyzed. The CPU 3 stores the count value (for the page at which the error occurred) of the analyzed page counter, and notifies the analyzation program 30 of the count value for the page. Program control returns to step S3.

Although, in the process at step S6, the analyzation program 30 reads data from the head of the job, the program 30 abandons all data input up to the data corresponding to (the page at which the error occurred—1 page). Then, the analyzation process is resumed beginning with the page at which the error occurred. In this manner, the printing resolution can be changed beginning with the page at which the error occurred.

When the printing resolution is changed only for the page at which the error occurred, the CPU 3 initializes the designated resolution (sets a high resolution) when the CPU 3 detects a print start command.

When the designated resolution is not initialized, the pages following the page at which the error occurred are printed at a low resolution. The page mode may be set in this way.

Figure 12:
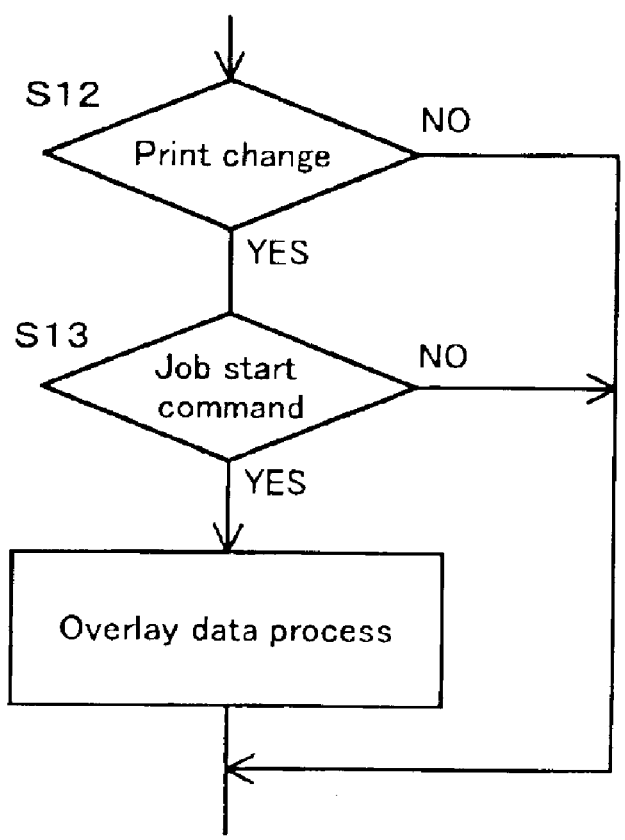
FIG. 12 is a flowchart showing the processing performed in accordance with an additional embodiment of the present invention.

FIG. 12 is a flowchart showing an additional embodiment of the present invention.

Figure 9:
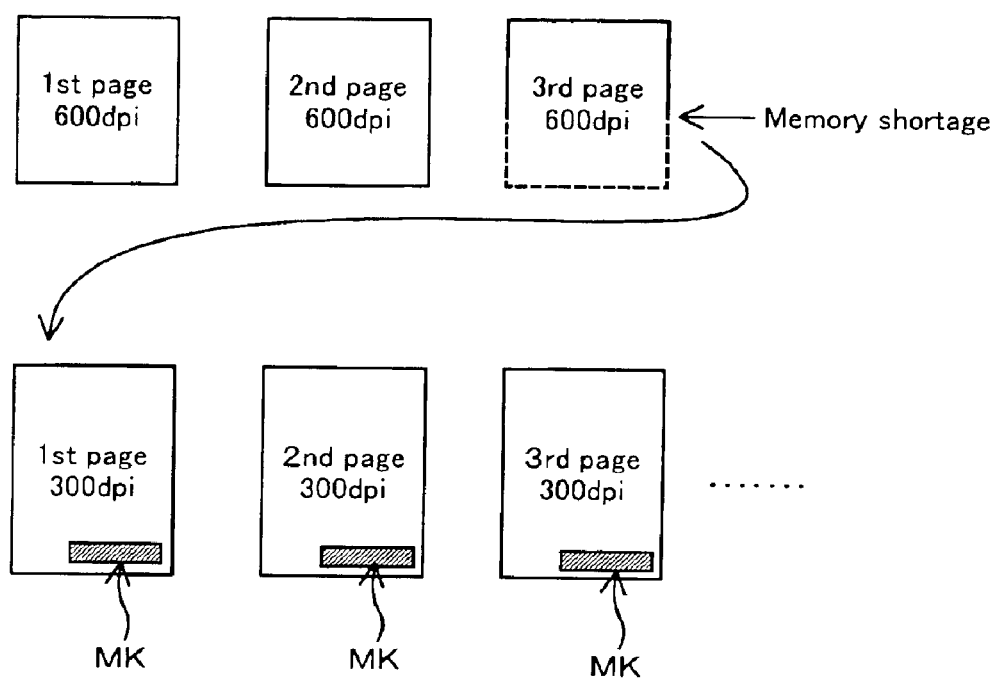
FIG. 9 is a diagram for explaining the printing operation performed in accordance with the embodiment of the present invention.

As is shown in FIG. 9 for the printing operation, a remark or a symbol MK representing a resolution change can be printed on a page for which the resolution was changed. Thus, the operator can easily identify a page whereat a resolution change occurred. It is preferable that the resolution change remark MK be printed at the bottom end of a printed page, but it is even more preferable that the remark MK be printed at a location selected by an operator.

The analyzation program for carrying out the above process is shown in the flowchart in FIG. 12.

(S12) When a memory shortage is detected, the analyzation program determines whether the printing of the resolution change remark has been designated using the operator panel 9. When the remark has not been designated, program control exits this routine.

(S13) When the resolution change remark has been designated, the analyzation program analyzes the input data and determines whether a job start command has been detected. When the input data are not for a job start command, program control exists this routine. But when a job start command is detected, the overlay data processing is performed. That is, the pattern of the resolution change remark is registered in advance as overlay data, and during the overlay data process, this pattern is read and is added to the development data for a page.

In this manner, when a job is started, the data for a resolution change remark are generated during the overlay processing. As a result, the resolution change remark can be printed on a page for which the resolution has been changed.

Similarly, in the page mode, the resolution change remark can be printed only on a page for which the resolution was changed.

In addition to the above embodiments, the present invention can be modified as follows.

(1) In the above embodiments, the resolutions 600 dpi and 300 dpi have been employed; however, other resolutions can be employed. Further, while resolution changes are effected that span only two levels, resolution changes may be effected that span three or more levels.

(2) While an electrophotographic apparatus has been employed as a printer engine, the present invention can also be applied for another type of page printer.

(3) while the number of blocks remaining in the memory has been monitored to detect a memory shortage, another memory area management technique can be employed.

The present invention has been described using the specified embodiments. However, the present invention can be variously modified without departing from the subject of the invention, and such modifications are included in the scope of the present invention.

As is described above, according to the present invention, the following effects are obtained.

(1) When a memory shortage occurs and compressed data can not be stored in the memory, the printing resolution is changed and the analyzation process is resumed for the input data beginning with the first page of the job. Therefore, the job can be printed, beginning at the first page, using the altered resolution. Thus, even when the resolution has been changed, the same resolution can be employed for all the pages of a document, so that the printing of a document which having an unaesthetic appearance, the result using different resolutions, can be prevented.

(2) Since the input data are managed for each job, even when a memory shortage occurs during the analyzation of a job, the analyzation process can be easily resumed, beginning with the first page of the job.

What is claimed is:

1. A page printer comprising:

a printer engine;

a memory which includes an input area, for storing input data, a compression area, for storing compressed drawing data, and a bit-map area, for storing expanded drawing data;

a compression circuit, for compressing drawing data and for storing the resultant compressed drawing data in said compression area of said memory;

an expanding circuit, for expanding said compressed drawing data and for storing the resultant expanded drawing data in said bit-map area of said memory;

a video output circuit, for transferring said expanded drawing data to said printer engine; and a controller for analyzing said input data for each job and creating drawing data for a designated resolution, wherein said controller changes said designated printing resolution to a lower printing resolution, and repeats an input data analyzation process beginning with said input data entered for the first page of said job when said controller detects a memory shortage of said compressed area, and prints said job at the lower printing resolution.

2. A page printer according to claim 1, wherein said controller updates a memory variable indicating the remaining capacity of said compression area at each time said compression circuit writes said compressed drawing data-in said compression area of said memory, and in accordance with said remaining capacity, determines whether said memory shortage has occurred.

3. A page printer according to claim 1, further comprising:

selection means which, to restart printing, selects either the first page of said job or a page whereat said memory shortage occurred, wherein, when a page whereat said memory shortage occurred is selected, said controller begins the analyzation of input data for said page whereat said memory shortage occurred.

4. A page printer according to claim 1, wherein said controller has an analyze point for indicating an analyze position of said inputted data for said job and initializes said analyze pointer when detects said memory shortage.

5. A page printer according to claim 1, wherein said controller changes said designated printing resolution to the lower printing resolution, and repeats the input data analyzation process beginning with said input data entered for the first page of said job when said controller detects the memory shortage of said compressed area during the input analyzation process, and prints said job at the lower printing resolution.

6. A page printer comprising:

a printer engine;

a memory which includes an input area, for storing input data, a compression area, for storing compressed drawing data, and a bit-map area, for storing expanded drawing data;

a compression circuit, for compressing drawing data and for storing the resultant compressed drawing data in said compression area of said memory;

an expanding circuit, for expanding said compressed drawing data and for storing the resultant expanded drawing data in said bit-map area of said memory;

a video output circuit, for transferring said expanded drawing data to said printer engine;

a controller for analyzing said input data for each job and creating drawing data for a designated resolution, wherein said controller changes said designated resolution to a lower one, and repeats an input data analyzation process beginning with said input data entered-for the first page of said job when said controller detects a memory shortage of said compressed area, wherein said controller creates a resolution change message to print on said resolution change page.

7. A page printer comprising:

a printer engine;

a memory which includes an input area, for storing input data, a compression area, for storing compressed drawing data, and a bit-map area, for storing expanded drawing data;

a compression circuit, for compressing drawing data and for storing the resultant compressed drawing data in said compression area of said memory;

an expanding circuit, for expanding said compressed drawing data and for storing the resultant expanded drawing data in said bit-map area of said memory;

a video output circuit, for transferring said expanded drawing data to said printer engine; and a controller for analyzing said input data for each job and creating drawing data for a designated resolution, wherein said controller changes said designated resolution to a lower one, and repeats an input data analyzation process beginning with said input data entered for the First page of said job when said controller detects a memory shortage of said compressed area, wherein said controller displays a resolution change message on a display panel.

8. A page printer control method comprising the steps of:

storing, for each job, input data in an input area of a memory;

analyzing said input data for each job, compressing drawing data at a designated resolution, and storing the resultant compressed drawing data in a compression area of said memory;

expanding said compressed drawing data stored in said compression area in said memory, and storing the resultant expanded drawing data in a bit-map of said memory; and transferring said expanded drawing data stored in said bit-map area of said memory to a printer engine, wherein said analyzing step includes the steps of detecting whether a memory shortage of said compressed area for one page, has occurred, and changing said designated printing resolution to a lower printing resolution, and repeating an input data analyzation process beginning with said input data entered for the first page of said job when said memory shortage is detected, and printing said job at the lower printing resolution.

9. A page printer control method according to claim 8, wherein said designated printing resolution is changed to the lower printing resolution, and the input data analyzation process is repeated beginning with said input data entered for the first page of said job when said memory shortage is detected during the input analyzation process, and said job is printed at the lower printing resolution.

* * * * *